United States Patent
Kaempfer (10) Patent No.: US 9,143,792 B2
(45) Date of Patent: Sep. 22, 2015

(54) METHOD AND SYSTEM FOR LOSSY COMPRESSION AND DECOMPRESSION OF COMPUTED TOMOGRAPHY DATA

(75) Inventor: Gideon Kaempfer, Raanana (IL)

(73) Assignee: XRING TECHNOLOGIES GMBH, Fuerstenfeldbruck (DE)

( * ) Notice: Subject to any disclaimer, the term of this patent is extended or adjusted under 35 U.S.C. 154(b) by 191 days.

(21) Appl. No.: 13/475,960

(22) Filed: May 19, 2012

(65) Prior Publication Data
US 2013/0301890 A1   Nov. 14, 2013

(30) Foreign Application Priority Data
May 11, 2012  (EP) .................................... 12167757

(51) Int. Cl.
| | |
|---|---|
| G06K 9/36 | (2006.01) |
| H04N 19/194 | (2014.01) |
| H04N 19/172 | (2014.01) |
| H04N 19/46 | (2014.01) |
| H04N 19/124 | (2014.01) |
| H04N 19/152 | (2014.01) |

(52) U.S. Cl.
CPC .......... *H04N 19/194* (2014.11); *H04N 19/124* (2014.11); *H04N 19/152* (2014.11); *H04N 19/172* (2014.11); *H04N 19/46* (2014.11)

(58) Field of Classification Search
None
See application file for complete search history.

(56) References Cited

U.S. PATENT DOCUMENTS

| | | | | |
|---|---|---|---|---|
| 6,470,065 | B1 * | 10/2002 | Lauther | 378/4 |
| 8,275,909 | B1 * | 9/2012 | Rothstein | 709/247 |
| 2003/0228041 | A1 * | 12/2003 | Bae et al. | 382/131 |
| 2007/0248271 | A1 * | 10/2007 | Sakai et al. | 382/236 |
| 2008/0292168 | A1 * | 11/2008 | Winkelmann | 382/131 |
| 2009/0208086 | A1 * | 8/2009 | Pelc | 382/131 |
| 2010/0014627 | A1 * | 1/2010 | Wang | 378/4 |
| 2010/0070836 | A1 * | 3/2010 | Wegener et al. | 714/799 |

FOREIGN PATENT DOCUMENTS

WO   WO 2011033381 A1 *   3/2011

OTHER PUBLICATIONS

Jia et al. "Establishment of Small-Scale PACS." Proceedings, International Info-Tech and Info-Net, vol. 6, 2001, pp. 149-154.*

* cited by examiner

*Primary Examiner* — Jon Chang
(74) *Attorney, Agent, or Firm* — Quarles & Brady LLP (57) ABSTRACT

A compressor and decompressor for CT scanner data first performs a lossless compression of individual CT sample value. After this compression, the compression ratio CR is calculated. This is compared to a target compression ratio. If the target compression ratio is larger or equal than the achieved compression ratio, and additional lossy compression is performed by reducing the number of bits of the lossless compressed values. Immediately after such a lossy compression a lossy decompression is performed within the compressor and the decompressed values stored as history for the compressor keeping the compressor and decompressor in sync. This allows for a better quality of decompressed data while achieving a higher compression ratio.

16 Claims, 5 Drawing Sheets

METHOD AND SYSTEM FOR LOSSY COMPRESSION AND DECOMPRESSION OF COMPUTED TOMOGRAPHY DATA

PRIORITY CLAIM

This application claims priority from European Patent Application No. EP 12167757.9 filed on May 11, 2012, which is herein incorporated by reference in its entirety.

BACKGROUND OF THE INVENTION

1. Field of the Invention

The present invention relates generally to the art of medical diagnostic imaging and baggage imaging and in particular to a method and apparatus for a computer tomography wherein the measurement data are compressed and possibly decompressed en route to the computer that reconstructs images of the scanned object.

2. Description of Relevant Art

In Computed Tomography (CT), raw data is acquired during a scan of an object irradiated by X-rays from an X-ray source from different directions (projections). The X-rays attenuated by the object are incident on a number of sensors (channels) that are arranged in multiple rows of a radiation detector. The number of rows is typically referred to as the number of slices.

The X-ray source and the detector are mounted on a rotor or gantry. Accordingly, for every rotor position, multiple vectors of data corresponding to the number of slices, also known as "fan" or "reading" are obtained. During a scan, the rotor is rotated in angular steps, each step giving a new reading. During or after a full rotation, the object to be examined (patient) is moved in a direction orthogonal to the rotors plane and data accumulated over many rotations is combined into one file that is accompanied by file meta-data and additional meta-data for each vector.

In exemplary CT scans having 640 sensors with 128 slices there are 640*128 channels and there may be 2000 readings per rotation. Accordingly, 164 million measurements per rotation are obtained with each measured value stored as an unsigned word of 16 bit (2 bytes). Thus, there are roughly 400 MByte of data per rotation. The number of rotations depends on the size of the patient to be scanned. With 4 rotations per second the data rate is approximately 1.6 Gbytes per second. For example approximately 10 to 20 rotations are required for scanning a human head. As such, a substantially high rate of data is generated that in turn is transmitted to a central processing unit for a reconstruction of the scanned object's images.

Therefore, compression methods capable of efficiently compressing this data en route to the computer can improve on the overall operation of CT imaging devices by reducing the storage space and bandwidth required for transmission of the data to the central processing unit.

CT imaging as a medical tool is well known for its benefits in medical analysis but at the same time, due to the use of X-rays, it is also known as harmful to the human (or other live object) being scanned. For this reason, in order to maximize the medical benefit from the minimal harm done, regulation requires that meaningful data obtained from a scan should not be lost. Sources of data loss may include lossy compression techniques as well as data corruption typically inevitable due to physical limitations of transmission means. Such transmission means typically ensure bit error rates below 1 part in 1,000,000,000,000 (10 to the power of 12) but not zero. For the size of data passed in a CT scan and calculated above (4-8 Gbytes), this implies that one in every few tens of scans may suffer one or more bit corruptions.

Due to the requirement not to lose meaningful data, compression algorithms for CT image data are preferably, albeit not exclusively, lossless compression algorithms. In addition, error detection and correction schemes should be used in order to protect against the unfortunate event of data corruption.

Several compression algorithms for CT imaging data have been proposed in the art. Most such algorithms, if not all of them, consist of three main steps: A first step where a prediction is made regarding the anticipated data, a second step where the data to be compressed is compared to the prediction and a third step where the difference between the data to be compressed and the predicted data is encoded as efficiently as possible (typically called the entropy encoding step). Such a compressor is disclosed in the international patent application publication WO 2011/033381 A1 offering a comparatively high compression due to an improved predictor and a further improved encoder.

For further increasing compression, lossy compression algorithms are disclosed in the U.S. Pat. No. 7,852,977 B2. Such compression algorithms remove specific parts of the data, which they consider not to be useful for image reconstruction. For estimating the degree of data removal, a feedback loop is provided for measuring outgoing data rates.

A slip ring (in electrical engineering terms) is an apparatus for making an electrical connection through a rotating assembly. Slip rings are also referred to as rotary electrical interfaces, rotating electrical connectors, collectors, swivels or electrical rotary joints. A slip ring consists of a conductive ring or band mounted on a shaft and insulated from it Electrical connections from the rotating part of the system, such as the rotor of a generator, are made to the ring. Fixed contacts or brushes run in contact with the ring, transferring electrical power or signals to the exterior, static part of the system. In essence, a slip ring is the equivalent of a power and communications cable with the ability to traverse a rotating joint without getting tangled up. Furthermore contactless data and power transmission systems are used, herein also referred as slip rings. An example is disclosed in US 20030185427 A1.

Slip rings are frequently used in CT scanners in order to connect between the rotor of the scanner which generates CT raw data and the stationary central processing unit which is used to reconstruct and display 3D images from this data.

Current slip rings are limited in their data throughput to about 10 Gigabits per second (10 Gbps which is 10E9 bits per second). For some high resolution CT scans this bandwidth isn't sufficient in order to transfer raw data and display CT images in real time on the stationary display. Hence, compression is useful in virtually expanding the communications capacity of a slip ring.

Compression algorithms are by definition dependent on the data they need to compress. It is well known in the art that for any compression algorithm there exists data which cannot be compressed at all and in particular cannot be compressed above a given threshold ratio. Hence, a system that is designed to be dependent on a minimal compression ratio that can always be achieved, may fail when data to be compressed fails to compress at the required ratio. This is true in particular to CT scanners that employ compression.

Without prior knowledge of scanned objects and the data generated by scanning them with a CT scanner, a CT scanner design would need to assume compression may not be effective at all. Hence taking worst case scenarios into consideration would eliminate the main benefit of compression—the ability to use relatively low throughput communications links for high bandwidth communications.

SUMMARY OF THE INVENTION

The embodiments are based on the object of improving compression of raw CT data by introducing an improved lossy compression. Another aspect is to compress data with a predetermined compression ratio, almost independent of the data. A further aspect of the invention is to reduce the loss to the absolute required minimum in order to achieve a desired compression ratio. Further aspects of the invention are a compressor and a decompressor, a method for compressing and the method for decompressing.

Disclosed herein are exemplary methods and systems for transferring data from a rotating data source such as an X-ray scanner to a stationary target such as a central processing unit over a slip ring. Specifically a method for compressing data, a method for decompressing data, a data compressor, a decompressor, a system for compressing and decompressing data, a slip ring having a system for compressing and decompressing data and a CT scanner having a system for compressing and decompressing data are disclosed.

A compressing slip ring system is disclosed comprising a compressor located on a rotating platform connected to a data generator from which it receives data, a slip ring split between such rotating platform and a stationary platform connecting between both platforms and a decompressor located on such stationary platform connected to a target via a communications network.

A compressor for a compressing slip ring system may comprise of any of the features disclosed in here.

A decompressor for a compressing slip ring system may comprise of any of the features disclosed in here.

A CT scanner comprising a compressing slip ring system may comprise of any of the features disclosed in here. Here the data generator is a digital sampler of analog signals received by a signal receiver from an X-ray detector, sometimes called a data acquisition system (DAS). Herein the term sample is used for a value representing one X-ray detector sample of one detector cell, which may be represented by 16 bits. A sample may also be called a pixel.

Generally, the embodiments differ from prior art by inserting the attenuation logic more deeply into the compressor itself hence reducing the length of the feedback loop and removing the need for loss in cases where desired compression ratios can be achieved without it.

Basically the lossy data compressor uses a lossless compression algorithm. Such a lossless compression algorithm is disclosed in WO 2011/033381, which is included herein by reference.

A lossless compression algorithm may comprise the following steps:
1) Input of samples from a data source like a CT scanner;
2) Selection of a model for predicting the data, preferably based on history.
3) Calculation of the differences $D=S-H$ between the received data and the model, where H is a reference value derived from historical data and S is the sample to be compressed;
4) Encoding of the differences calculated;
5) Output of the encoded data;

Preferably the model is based on history. An exemplary model for calculating the reference value H based on history values $H1, H2, H3$, might be: $H=H1+H2-H3$. Herein, history is the data that will be reconstructed by the decompressor (in a lossless compressor this should be identical just to the original data received in the past by the compressor). $H1$ may be the latest history value. A reference is a value which represents the prediction of the value to be compressed. It is normally derived from history. In an alternative the reference may be fixed for cases when no history exists or when a compression without depending on history such as for synchronization purposes in case of compressed data corruption is required. The history values may have been generated by the calculation of sample decompressed values as shown below. In general, H can be a single pixel value from a previous frame, at multiple possible locations or a combination of such pixel values, a pixel value from the current frame (which has just been compressed) such as an adjacent pixel, or a combination of such pixels or a combination of such pixels and pixels from a previous frame. For example, history values may be taken from one of two history frames—the previous and before previous frame. In general, any pixel group from stored previous frames may be taken. In addition, the pixels from the currently processed frame may also be used as history, as long as no circular dependency is created. Within the history frame, history pixels may be taken from (x, y) coordinates which are identical to the coordinates of the pixels within the frame being processed or coordinates at a given offset $(x+\Delta x, y+\Delta y)$ from those of the pixels within the frame being processed where $\Delta x$ and $\Delta y$ may be a small positive or negative integers in a predefined range. $\Delta x$ and $\Delta y$ may in turn be expressed in terms of a single integer mapped to the given offsets. In another embodiment, the only reference offset used is $(\Delta x, \Delta y)=(0,0)$—only the identical coordinates of the pixels being encoded within a previous frame.

Compression algorithms may handle groups of input samples together. Such grouping may imply that common compression techniques are applied to a group of samples which may represent one sensor reading. In the above mentioned lossless compression algorithm groups of N samples in a row are compressed using a single prediction model (single vector into history as reference). The compression of a group of input samples may result in a compressed output size G per group of N samples. The average number of bits per sample in the compressed stream is then G/N. The average compression ratio is then expressible by $B/(G/N)=B*N/G$ where B is the number of bits per sample in the input. A typical value for B may be 16

The lossy compression may be controlled by control parameters. One of these control parameters may be the maximum allowed loss of data. Preferably this is the maximum allowed loss of data per input sample. It may be indicated in bits per sample. It may be fixed for all samples or may be represented as a function of the sample location within the structure of the input data stream, for example as a function of the sample location within the frame. This may be used in cases where part of the data must be compressed without loss, such as a more significant part of the data, while other parts may be compressed with some degree of loss, such as a less significant part of the data. Another of these parameters may be the target compression ratio or any equivalent thereof like the target output rate, further referred to as target compression ratio. Preferably this may be the target number of compressed bits T per N input samples, wherein N is an integer number and preferably may be the number of samples in a group as used in a basic lossless compression algorithm. Hence, T may be the target number for G, as discussed above.

Based on the data input, continuously the current compression ratio or any equivalent value, which may be the output rate and/or number of compressed bits per N input samples, is calculated. For simplicity this is further referred to as compression ratio. Furthermore an average value of the compression ratio may be calculated.

If the current compression ratio is higher or equal to the target compression ratio, data compressed by the lossless compression is output. There is no need to introduce information loss by using lossy compression.

If the current compression ratio is lower than the target compression ratio a group of N samples will be compressed together as follows.

First, there may be at least one further attempt to compress without loss. If this was successful and the target compression ratio can be reached, the lossless compressed data are output.

If the target compression ratio cannot be reached by a lossless compression, the number R of bits, rounded to its nearest integer, by which the compressed data have to be reduced is calculated. If this number is larger than the allowed loss of data, the allowed loss of data is used as R. Then the R least significant bits from each of the differences D calculated in step 3 of the lossless compression algorithm are removed resulting in new reduced difference values $D_R$.

A compressed output vector comprising the compressed values of the group of N samples is marked as lossy and further preferably contains information about R.

The encoding of the number R of bits to reduce may be performed such that in case no bits are reduced a single prefix bit, which may be "0", is added as a header to the compressed encoding of the N samples while if bits were reduced, multiple bits of the form "$1b_1b_2b_3b_4$" are added as a header where "$b_1b_2b_3b_4$" may be a binary number representing the number of reduced bits or an optimal encoding such as Huffman or Golomb-Rice encoding of the number of reduced bits. This allows minimal overhead in case of lossless compression which may be the predominant compression mode. Most preferably "$b_1$" is the least significant bit, while "$b_4$" is the most significant bit. The order may also be reversed. It is obvious that the number of bits can be adapted to the required numerical range and that the sequence of bits may be changed. In particular, such encoding of "b1b2b3b4" need not represent the value zero which is represented already by the prefix bit.

To allow the compressor to operate synchronized to the decompressor, an immediate decompression is performed preferably within the compressor. Instead of storing the incoming raw/data as the compressor's history, the data as to be decompressed by the decompressor is stored as the compressor's history.

In the following this decompression within the compressor is described in further detail. It is similar to the decompression which is performed in a decompressor. As this decompressor within the compressor has direct access to all compressor data, it does not implicitly require specific information like a mark indicating that lossy compression was applied. In addition, since it will be responsible for the encoding of the differences, it will also have access to the non-encoded differences. It just needs to emulate the expansion of the differences back to their original size and the actions that follow to create the decompressed data.

Preferably, the decompression is implemented like a lossless decompression as disclosed in disclosed in WO 2011/033381, except for vectors that are marked as lossy compressed. In this case, prior to decompression, the difference values are expanded back to their original size.

If the output vector has been encoded, it will be decoded first, although it is preferred that the decompression step of the compressor receives the output vector in a non-encoded form to reduce computational overhead. Then the individual values of the samples are reconstructed. Most preferably a difference value D has been generated by the compressor as the result of the Mathematical subtraction: D=S−H, where H is a reference value derived from historical data and is the sample to be compressed. It is further preferred if this difference D is expressed by a signed M-bit number like "$d_{M-1}d_{M-2}d_{M-3}d_{M-4}\ldots d_0$", where M is a positive integer. In general this number can hold the difference of two unsigned M-1-bit numbers, where "$d_{M-1}$" is the most significant bit and "$d_0$" is the least significant bit. Due to the previous compression, this number has been reduced by R least significant bits resulting in a reduced difference $D_R$ "$d_{M-1}d_{M-2}d_{M-3}d_{M-4}\ldots d_{R+1}d_R$", which has a length of M-R bits.

The decompressed value may be calculated without need to go through a stage of optimally encoding the resulting reduced difference, $D_R$. First, the R least significant bits (LSB) of the reduced difference $D_R$ are filled up with a sequence of bits. This may be any preferably predetermined sequence of bits. Most preferably this is a sequence starting with "1000 . . . ". Accordingly bit R-1 is filled up with "1", while bits R-2, R-3 and further consecutive bits are filled up with "0". This may result in a number like "$d_{M-1}d_{M-2}d_{M-3}d_{M-4}\ldots d_{R+1}d_R10\ldots 0$". This new number with a length of M bits is further referred to as the approximate difference D'.

In a next step a first approximation value S' of an original sample is calculated by S'=D'+H, where H is the relevant reference value from history, which is the same for the compressor and the decompressor. Here, S' is a first approximation since it may actually be distant from the required value due to an overflow. This may happen due to the "1" in the least significant bits replacement of the previous step which can cause D' to be larger than D if it is positive or smaller than D if it is negative. For example: if H=0xFFFF, S=0xFFFF, D=0 and R=5, there would be D'=0x10 and S'=H+D'=0x1000F which requires 17 bits to be represented instead of 16 bits for a sample. A similar overflow may happen if D' is negative and H is close or equal to zero. If left unhandled, such an overflow would result in a significant deviation from the original sample S when expressed as an unsigned number with the same number of bits. For this reason, first S' preferably is expressed with one more bit than the original samples.

Following the calculation of S' a simple overflow check may be used which is to test if S' has its MSB set or not. If not, no overflow has occurred. If the MSB is set to 1, this implies an overflow. A further approximation S" is calculated from S', if the MSB of S' is not set, S" is S' without its MSB. If the MSB of S' is set, then D' is used to calculate S". If D' is positive, then S" is set to a predetermined value, preferably the maximal sample value (e.g. 0xFFFF). If D' is negative, S' is set to zero (0x0000). The above definition of S" effectively limits the error (S-S") to remain within the required error boundaries of R bits but without allowing an overflow. In the above example, where S' resulted in 0x1000F, since its MSB is set and D' is positive, the result is S" being 0xFFFF (which also happens to be the original value of 5).

Finally, the value S" is stored in history of the compressor and of the decompressor for use by later compression steps instead of S. This ensures the consistency between the compressor and decompressor which is required to use the same mechanism for sample reconstruction using history and an incoming (decoded) difference.

The table below shows some numerical examples of the method:

| Input Sample (S) | 200 | 400 | 800 | 200 |
|---|---|---|---|---|
| References (H) | 100 | 200 | 100 | 200 |

| -continued | | | | |
|---|---|---|---|---|
| Lossless differences (D) | 100 | 200 | 700 | 0 |
| R | 1 | 2 | 4 | 0 |
| D reduced | 50 | 50 | 43 | 0 |
| D reconstructed (D') | 101 | 202 | 696 | 0 |
| Reconstructed Samples (S') | 201 | 402 | 796 | 200 |
| Error (loss) | 1 | 2 | 4 | 0 |

Here the sum of all D reduced is 143, while the sum of all errors is 7.

For comparison the value of the compression as known of prior art are shown below:

| Attenuation level R (fixed for 4 cycles): | 2 | 2 | 2 | 2 |
|---|---|---|---|---|
| Input Sample (S) | 200 | 400 | 800 | 200 |
| Reference (H) | 100 | 200 | 100 | 200 |
| Attenuated samples | 50 | 100 | 200 | 50 |
| Attenuated history | 25 | 50 | 25 | 50 |
| Lossless differences (D) | 25 | 50 | 175 | 0 |
| Reconstructed Attenuated Samples (lossless) | 50 | 100 | 200 | 50 |
| Deattenuated samples | 202 | 402 | 802 | 202 |
| Error (loss) | 2 | 2 | 2 | 2 |

Here the sum of all lossless differences is 250, while the sum of all errors is 8. Accordingly the compression as described herein has a lower count of differences resulting in a lower amount of data and it has in addition a lower error rate. These examples are based on the assumptions of 1) Difference encoding size is proportional to difference size (this is normally the case in entropy encoding), and 2) Feedback for prior art takes 4 ticks (only after 4 ticks can the attenuation level be updated since only then does previous attenuation affect the compressor output).

In a preferred embodiment, the number R of bits to reduce by the lossy compressor may be predefined for a predetermined number of samples. This has the effect that R has to be transferred to the decompressor only once for a predetermined number of compressed samples. Furthermore R may be constant throughput the scan or may vary over time. R may be based on a previous data analysis. Examples of such a previous data analyzes are given later in more detail.

According to another embodiment, the number of bits to reduce R by the lossy compressor may be set to zero. This may be for the case, when the lossless compressor calculates, that it is better not to compress data. An example is non-compressible data.

In a further embodiment, the number of bits to reduce R by the lossy compressor may be calculated based on the moving average of the output rate. This may be done over a predetermined time or number of samples. Therefore the loss over many sample groups is averaged. Furthermore weighting may be done exponentially for example by using the formula $(1-\alpha)*A+\alpha*B$ where $\alpha$ is a value between 0 and 1, A represents the previous average number of bits per compressed sample group and B represents the current number of bits per compressed sample group. When $\alpha$ is set close to zero, the average converges slowly towards the current number of bits per compressed group of samples. When $\alpha$ is set close to 1, the average converges rapidly towards the current number of bits per compressed group of samples. A typical value for $\alpha$ may be 1/64 or any other negative exponents of 2 of the form $2^{-N}$ where N is a positive integer.

Generally, the number of bits reduced R may be a non-integer as described in the art. To achieve a non integer reduction, the original difference may be multiplied first by a value M and only then R bits may be reduced from it. If M is not a factor of 2, e.g. M=3, and then the number of reduced bits may effectively be a non integer value resulting in more accurate bit reduction. M would need to be sent with the compressed data so that the decompressor may reverse the action of multiplication prior to reconstructing the original approximate data samples. For example, a difference value is 10000b (16 decimal) before loss, and the multiplier M=3 is used which results in 3*16=48=110000b. Then, three bits are removed for lossy compression resulting in 110b (6 decimal). The decompressor will reconstruct 110100 (52 decimal) resulting in an error of +4 and then divide by M=3 resulting in 17.333 which is rounded to 17 resulting in an error of +1. For 3 reduced bits using a multiplier of 3, the possible error range will be between −1 and +1 (a range of a bit less than 2 bits).

Compressed data may be streamed directly in a continuous stream for mat over a slip ring or contactless data link or it may be accumulated in packets. Such packets, which would preferably have a fixed size, such as 1024 bytes, may be augmented by a packet header and a packet trailer. The packet header may include packet sequence numbers as well as information relating to the compressed data such as a pointer to a specific bit offset within the packet which is a first bit of an encoded group of samples and the sequence number of such group. The trailer may be a checksum, such as a cyclic redundancy check (CRC)—for example a CRC32 as used for Ethernet or CRC32C as used for ISCSI (the latter has dedicated hardware acceleration in modern Intel processors using SSE4.2). In addition to the packets carrying compressed data, additional packets may be generated and sent with these packets which may contain redundant data derived from these packets.

The pointer in the packet headers may be used to allow resynchronizing the decompressor on the compressed data stream in case of packet loss. The group sequence number in the headers may serve to determine to which location in the decompressed data as compressed data relates to allow the decompressor to skip ahead in case of permanent or temporary data loss. In addition, the packet sequence numbers in the headers may be used in order to organized multiple packets in blocks together with packets carrying redundant data to allow error correction in case of packet loss by using a Forward Error Correction (FEC) scheme. The checksum in the packet trailer may be used in order to detect corrupted packets. When a packet is corrupted, the FEC scheme may reconstruct it based on the information carried by the packet block as a whole. When using such FEC scheme, there is no need for retransmission of specific packets in case of packet loss.

All packets may be accumulated before transmission over a slip ring or contactless data link in a FIFO memory which may serve as a memory buffer in case transmission needs to be interrupted or in case multiple sequences of packets need to be interleaved into a single serial sequence. Such FIFO memory need only allow writing data to its write interface and need only allow reading data from its read interface using standard write enable and read enable signals, accompanied by flags indicating if the FIFO is full, almost full, empty or almost empty. Since packets are preferably fixed length packets, no reference is required to the location of packets within the FIFO since mere counting of output words is sufficient for determining when a full packet or more is present in the FIFO and ready to be read. Such FIFO is well known in the art and is presented, for instance, on page 25 of the Xilinx FIFO Generator v3.1 User Guide dated Jul. 13, 2006

After compression the compressed and preferably encoded output vector may be transmitted via a slip ring or contactless data link. Alternatively and/or additional data may be sent through a storage interface which may be used to store data on storage like a SSD or memory stick. In such a system, decompression could be performed immediately at the output of the storage interface or as part of the application consuming the stored compressed data.

A decompressor receives as input the con pressed output vector of the compressor and decompresses the incoming data. Basically the decompressor is implemented like the decompressor element of the compressor as described above with, in addition, a decoding mechanism for the encoded data (i.e. compression parameters and entropy encoded differences). If the output vector has been encoded, it will be decoded first.

After decoding, the individual values of the samples are reconstructed. First, the R least significant bits (LSB) of the reduced difference $D_R$ are filled up with a sequence of bits to calculate a decompressed value. This may be any preferably predetermined sequence of bits. Most preferably this is a sequence starting with "1000 . . . ". Accordingly bit R-1 is filled up with "1", while bits R-2, R-3 and further consecutive bits are filled up with "0". This may result in a number like "$d_{M-1}d_{M-2}d_{M-3}d_{M-4} \ldots d_{R+1}d_R 10 \ldots 0$". This new number with a length of M bits is further referred to as the approximate difference D'.

In a next step a first approximation value S' of an original sample is calculated by S'=D'+H, where H is the relevant reference value from history, which is the same for the compressor and the decompressor. Here, S' is a first approximation since it may actually be distant from the required value due to an overflow. This may happen due to the "1" in the least significant bits replacement of the previous step which can cause D' to be larger than D if it is positive or smaller than D if it is negative. A similar overflow may happen if D' is negative and H is close or equal to zero.

Following the calculation of S' a overflow check may be used which is to test if S' has its MSB set or not. If not, no overflow has occurred. If the MSB is set to 1, this implies an overflow. A further approximation S" is calculated from S'. If the MSB of S' is not set, S" is S' without its MSB. If the MSB of S' is set, then D' is used to calculate S". If D' is positive, then S" is set to a predetermined value, preferably the maximal sample value (e.g. 0xFFFF). If D' is negative, S' is set to a predetermined value, preferably zero (0x0000). The above definition of S" effectively limits the error (S-S") to remain within the required error boundaries of R bits but without allowing an overflow. In the above example, where S' resulted in 0x1000F, since its MSB is set and D' is positive, the result is S" being 0xFFFF (which also happens to be the original value of S).

Finally, the value S" is stored in history of the decompressor for use by later decompression steps.

For clarity reference is made herein to the compressor and a decompressor. This may be either a hardware component for compressing and/or decompressing, a software component for compressing and/or decompressing or a method for compressing and/or decompressing of data. The implementation may be in hardware and/or software.

In general the methods of compression and decompression, the compressor and decompressor disclosed herein are preferably used for compression of CT raw data, but they may be used for any other kind of data allowing a lossy compression. Furthermore the transmission of compressed data is not limited to a transmission via a slip ring or contactless data link. Instead data may be transmitted by of any other transmission means and/or stored in a memory. Alternatively and/or in addition data may be sent through a storage interface which may be used to store data on storage like a SSD or memory stick. In such a system, decompression could be performed immediately at the output of the storage interface or as part of the application consuming the stored compressed data. The algorithms and methods disclosed herein are understood to be implemented on a computer, a microprocessor, an FPGA or an ASIC. They may be stored on a suitable storage device, like magnetic disks, hard disks, SSDs, CDs, DVDs or memory sticks.

A significant advantage of the embodiments is the ability to decide during the compression process itself if the achieved compression ratio is sufficient or not. If the compression ratio is sufficient (e.g. when data presented happens to be very similar to previously observed data) the compressor may preserve the original data quality without resorting to lossy compression which reduces the quality of compressed data. In contrast, lossy compression algorithms presented in the art apply lossy compression to all data within a given data segment (or during a specific time frame) regardless of the relationship between this data and prior observed historical data. As a result, they do not leverage the possibility of preserving data quality in case sufficient compression can be achieved for data sub-segments which may be significantly smaller than segments for which lossy compression is selected.

An alternative envisioned approach to solving the problem of selecting the optimal compression method under a constraint of best quality with variable loss levels would be to couple multiple compressors in parallel, each performing compression without or with a given loss level and selecting the sufficiently compressed output with the highest quality. The benefit of such an approach would be that the selection mechanism (i.e. which data output to use) could be relatively straightforward. However, such an approach could be quite complex and resource intensive. This is because it is extremely difficult to efficiently combine the output of entropy encoded data and it requires encoding compressed data multiple times in parallel before a decision can be taken on which data to use. This can result either in very slow (if all alternatives are explored in serial) or very resource intensive (if all alternatives are explored in parallel) compression. The approach presented in the current invention limits the need for additional required resources to the specific point of difference calculation while leaving the entropy encoding part of the compression as one single mechanism (without duplication). This is possible due to the ability to exactly calculate or estimate the size of encoded data based on the values of the calculated differences. This novel approach is what allows the presented method to optimize the quality of compressed data given the required loss levels for specific data sub-segments while requiring little more resources than a lossless compressor.

An alternative approach to minimizing compression resources while implementing a variable loss level compressor is presented in the art. In this approach, samples presented to a lossless compressor are attenuated based on a mechanism external to the compressor which estimates the level of loss required in order to achieve a certain compressed data rate. This approach also has the benefit of using little more resources than required by a lossless compressor, but due to the relatively long latency between the time data is presented to a compressor and the time the compressed data rate can be determined, it is inevitable that the level of attenuation can only be adjusted periodically, resulting in a fixed level of attenuation for significant data segments. As a result, if within such data segment there are sub-segments which could have been compressed without attenuation the potential of producing higher quality compressed data is lost. As presented above, this is not the case in the current invention where the feedback from compression ratio to level of loss is immediate.

BRIEF DESCRIPTION OF THE DRAWINGS

In the following, the invention will be described by way of example, without limitation of the general inventive concept, on examples of embodiment and with reference to the drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
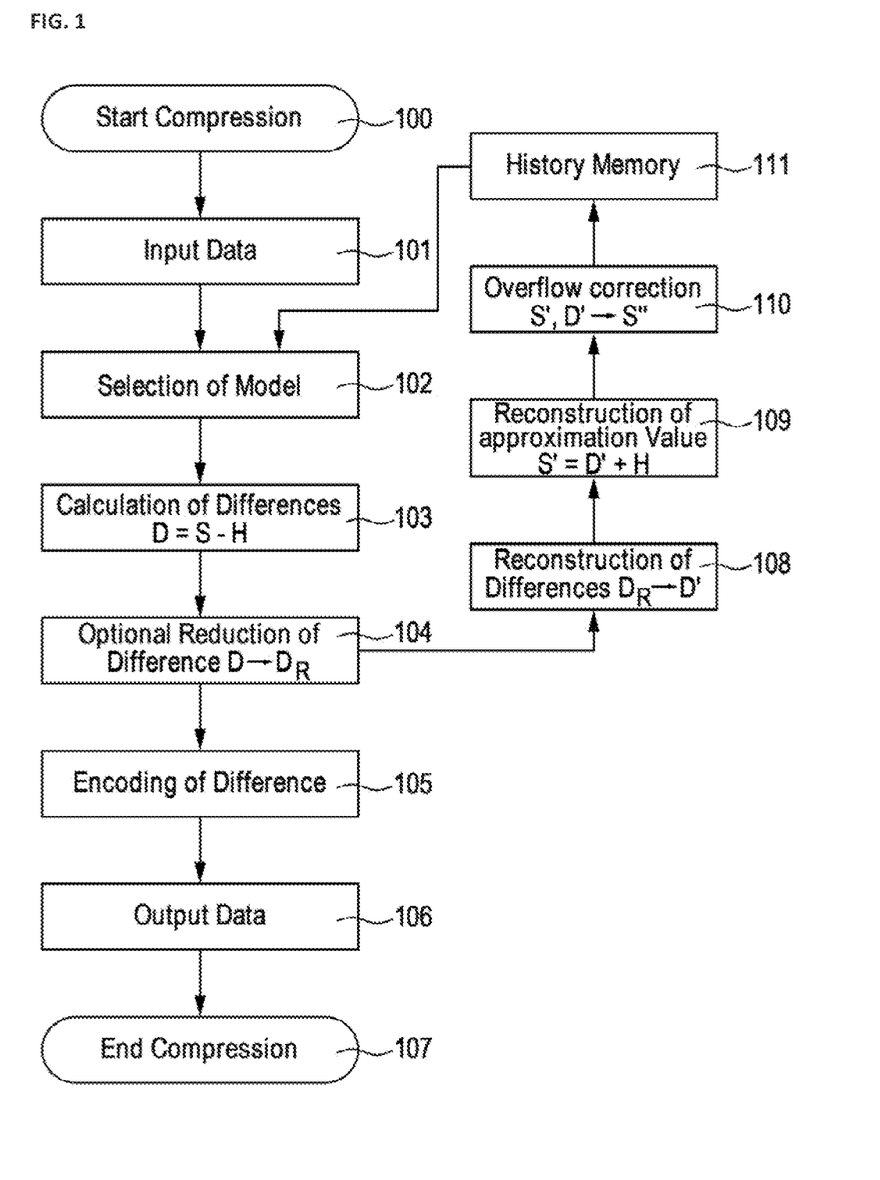
FIG. 1 shows the flow diagram of the compression algorithm.

FIG. 1 shows a basic compression algorithm. The compression starts this step 100. In step 101 data is input from the data source like a CT scanner. Preferably a block of N input samples, wherein N is an integer number, is input and further processed together. In the following step 102, an appropriate mod for predicting the data is selected. The selection may be based on history like previously input data, preferably data which has been stored in history memory in step 111. With the selected model in step 103 the differences between the received data of input step 101 and the model D=S−H are calculated. If a required compression cannot be reached by the algorithm, an optional reduction of differences is performed in step 104. This step, calculating the reduced differences $D_R$ from the differences, D, may be called a difference reducer. By using these reduced differences, decompressed values are calculated in steps 108-110. First in step 108 reconstructed differences D' are calculated from the reduced differences $D_R$. then, in step 109 approximation values S' of original samples are calculated by S'=D'+H using the reduced differences D' and the relevant reference values H from history which have been used for compression. Finally in step 110 an overflow correction may be applied. Here an overflow corrected approximations S" are calculated from S' by using D'. In step 111, the overflow corrected approximations S" are stored in history memory. The previously calculated and optionally reduced difference are encoded in step 105. Finally in step 106 the encoded data are output and may be transmitted via a slip ring or contactless data link or a storage interface. The compression algorithm ends with 107.

Figure 2:
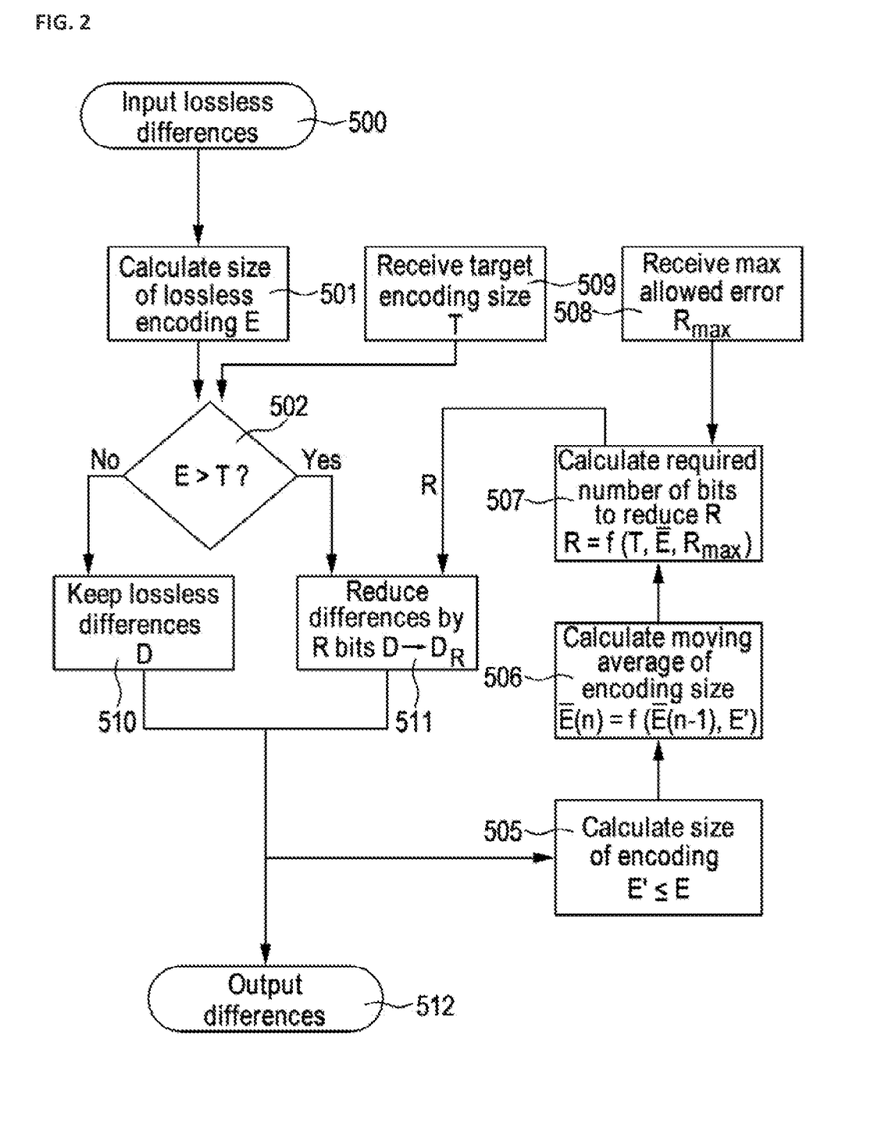
FIG. 2 shows the flow diagram of an algorithm for reducing of the differences.
Figure 4:
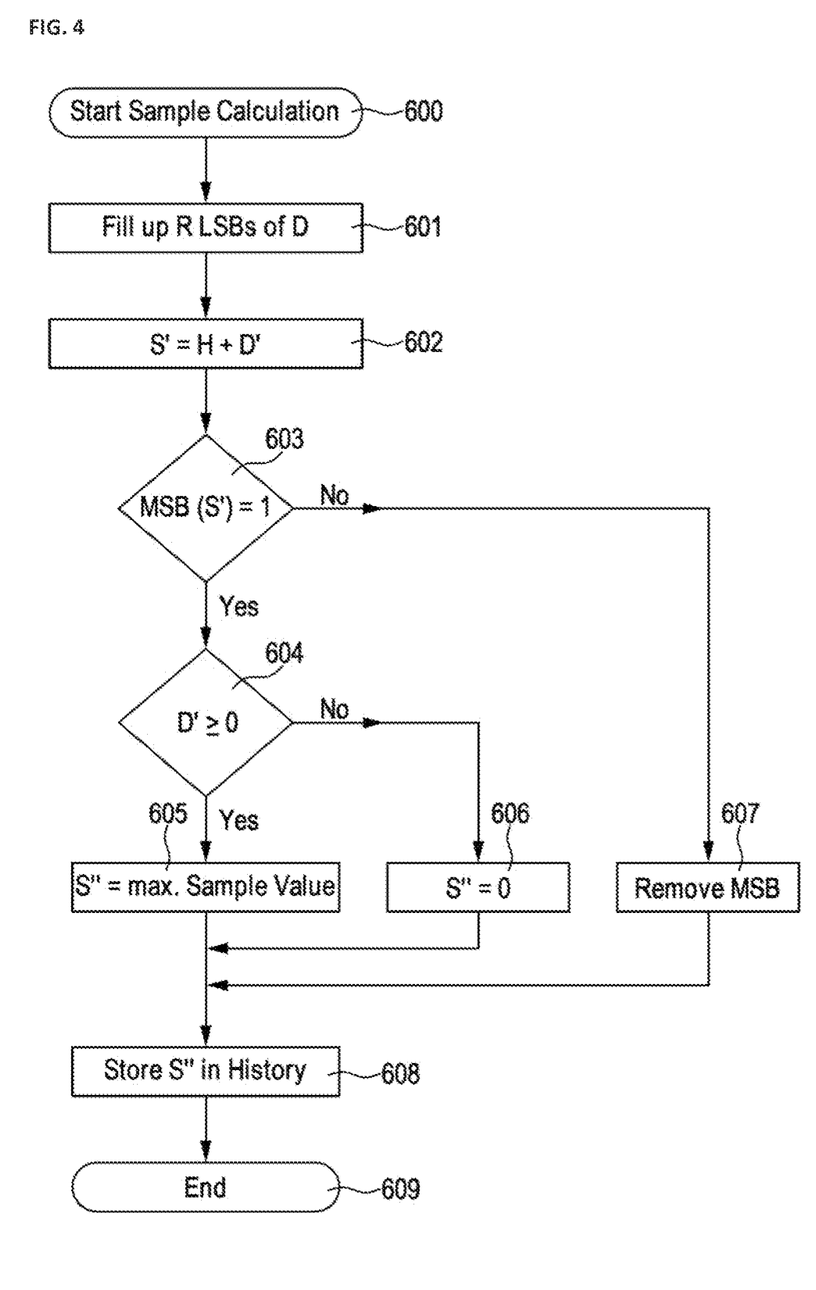
FIG. 4 shows the calculation of a decompressed sample value.

FIG. 2 shows the flow diagram of an algorithm for optionally reducing of the differences according to step 104 in the previous figure. In step 500 the lossless differences as calculated in step 103 are input. In step 501 the size E of the lossless encoding is calculated. This depends on the encoding mechanisms used for encoding differences. In a preferred embodiment, differences are to be encoded using a Golomb-Rice encoding with a parameter K. In such encoding, the length of an encoded difference can be calculated as K plus the number represented by the most significant bits of the difference beyond its K least significant bits plus one. For example, if K=4 and the difference D is 0x002A, the length of encoding would be K+0x002+1=7. For other encodings, the length may also be calculated or estimated. This is compared in step 502 with the target encoding size T received in step 509. When E is not greater than T, then the lossless differences are kept for further use in step 510. When E is greater than T, the differences are reduced in step 511 by R bits, where R is obtained from previous step 507. Reduction may be done as shown in FIG. 4. From the differences in step 505 the actual size of encoding E' is calculated. For the case, the lossless difference D was kept, this actual size of encoding E' is equal to the previously calculated size E of the lossless encoding. If the difference was reduced in step 511, the actual size of encoding E' is less than the previously calculated size E of the lossless encoding and may be calculated in the same manner. Based on the actual size of encoding E' a number R of bits to reduce for step 511 is calculated. Here for example a moving average $\bar{E}$ as shown in step 506 may be calculated as a basis for calculation of R in step 507. Preferably the calculation in step 506 may be expressed by $\bar{E}(n)=f(\bar{E}(n-1), E')$. Most preferably this function is $\bar{E}(n)=(1-a)*\bar{E}(n-1)+\alpha*E'$, where $\alpha$ is a value between 0 and 1, governing the speed of convergence to the current size. Generally the calculation may also be based on any other previous value. In step 507 the maximum allowed error $R_{Max}$ received in step 508 is used together with $\bar{E}$ and preferably for calculation of R. $R_{max}$ may be fixed for the entire scan or may be a function of the group location within the frame. The calculation may be based on =min $\{R_{Max},(T-\bar{E})*k/G\}$, where k is a predetermined gain factor and G is the number of samples in the group being encoded with the same R. The result is limited to $R_{Max}$. In step 512 the calculated differences are output and may be used as input of step 105 of the previous figure.

Figure 3:
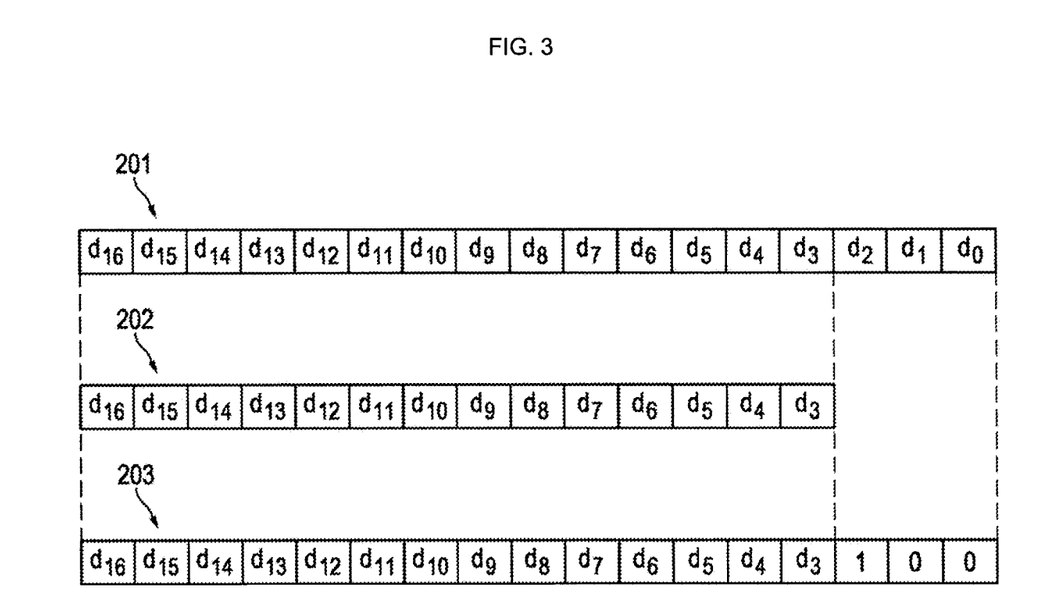
FIG. 3 shows values as used by the decoder.

FIG. 3 shows values as used by the difference reducer. A first exemplary difference value 201, being the input of the difference reducer having a length of M=17 bits may be the result of a lossless compression. This signed number can hold the difference of two unsigned 16 bit numbers and may have a binary form like "$d_{16}d_{15}d_{14}d_{13}d_{12}d_{11}d_{10}d_9d_8d_7d_6d_5d_4d_3d_2d_1d_0$", where "$d_{16}$" is the most significant bit (MSB) and "$d_0$" is the least significant bit (LSB), in a typical encoding, the MSB may also be interpreted as the sign of the difference where it is set for negative numbers and unset for positive numbers. A second exemplary difference value D,202, being the output of the difference reducer and the input of the difference reconstructor, having a length of M=14 bits may be the result of a lossy compression, wherein the number of bits were reduced by R=3. Here the least significant bits were removed. The decompressor generates the approximate difference D',203, being the output of the difference reconstructor, from difference D,202 by filling up the least significant bits with a sequence of bits starting with "1000 . . . ".

FIG. 4 shows the calculation of sample decompressed values, giving details of previously shown steps 108-110. The procedure starts with step 600. In a first step 601, corresponding to step 108, an approximate difference D' is calculated. For this, the least significant bits of a difference value D, which have been removed during lossy compression, are filled up with a predetermined pattern. Preferably R least significant bits (LSBs) are filled up with a pattern like "1000 . . . ". The most significant bit of the filling pattern preferably is a "1", while all or other bits are filled up with "0". This step may be called a difference reconstructor. In a next step 602, corresponding to step 109, a first approximation S' of an original sample value is calculated by S'=H+D', where H is the relevant reference value preferably derived from history, which is the same for the compressor and the decompressor. Preferably, the numerical values of H and D' have the same number of bits, although this is not required as long as no bits are lost in the addition. During addition of these values an overflow may occur. The overflow is handled in steps 603-607, which are summarized in previous shown step 110. Therefore the sum of both numbers requires an additional most significant bit. A check for such an overflow is done in step 603 by checking whether the (MSB) most significant bit of S' is "1". If it is not "1", then in step 607 a second approximation value S" is calculated by removing the most significant bit of S'. For the case an overflow occurred and the most significant bit of S' is "1", then a further decision has to be made in step 604, whether D' is positive and therefore greater or equal than zero. If it is positive, then S" is set in step 605 to the maximum sample value, preferably to a series of "1" of the length of the number of bits per sample. If it is negative, then S" is set to zero in step 606. After calculating S", this is stored in history of the lossless compressor in step 608, corresponding to previous shown step 111. The procedure ends with 609.

Figure 5:
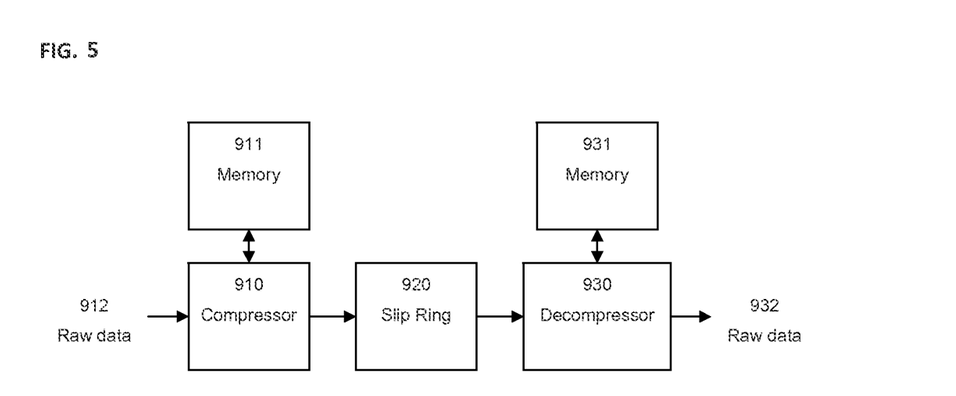
FIG. 5 shows a schematic diagram of a compressing slip ring.

FIG. 5 shows a schematic diagram of a compressing slip ring. It may also apply to a data transmission system in general or a compressing storage. It comprises of a compressor 910 with memory 911 included or attached to it, a slip ring 920 and a decompressor 930 with memory 931 included or attached to it.

The compressor 910 may be located on a rotating platform, referred to as the rotor, from which raw data 912 is obtained such as data from X-ray sensors on a computer, tomography scanner, also referred to as data generator. The compressor receives such raw data and may store it in its attached memory 911. The memory 911 may be used by the compressor 910 in order to store historical raw data as reference for compression as well as a temporary buffer used for data before or after compression in cases where the compressor cannot immediately transmit data over the slip ring, for instance due to throughput limits of the slip ring.

The memory 931 may be used by the decompressor 930 in order to store data in events where such target, or network leading to such target, are not capable of receiving the data at the rate produced by the decompressor.

The compressor 910 may transmit compressed data over the slip ring 920 towards the decompressor 930 which may store data in attached memory buffers 931. The decompressor 930 delivers at its output uncompressed raw data 932. Furthermore compressed data may be stored on the stationary unit or any storage element for further use.

The decompressor 930 may be located on a stationary unit, referred to as the stator, from which raw data may be sent to a central processing unit or server for data analysis and display or to a storage element. The decompressor receives compressed raw data and may store it or its decompressed version of data in its attached memory 931.

Figure 6:
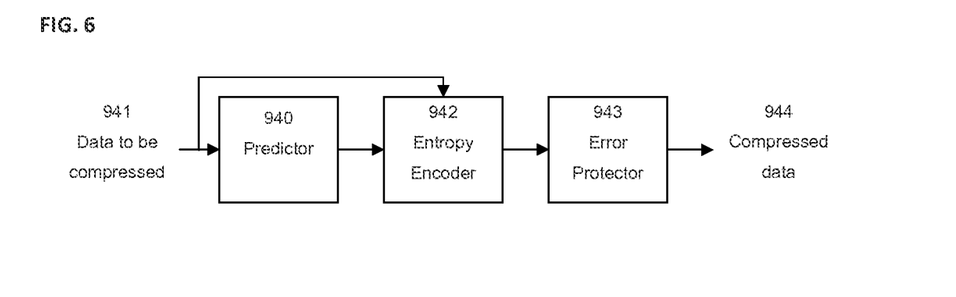
FIG. 6 shows a lossless compressor in detail.

FIG. 6 shows a lossless compressor in detail. Such a compressor may be employed for image compression as well as other types of data. However, it should be appreciated that other types of data may also be compressed in similar fashion even if such data doesn't represent an image. For instance, such data may represent any type of data including digitally sampled data from a variety of sources such as light, electromagnetic radiation or audio. Preferably the data to be compressed is scaled before compressing. Such a scaling may comprise adding or subtracting of an offset value and/or multiplying with a scaling value and/or applying of a transfer function. In the specific case of a CT scanner by scaling the signals of different physical detector modules having different scintillators or different signal processing components may be equalized. Equalization may be based on reference measurements with the same detector(s) or with reference detector(s). The compressor may compress data in the format of fixed point e.g. 16 bit or floating point (e.g. 12 bit mantissa, 4 bit exponent). In case of fixed point data a conversion to floating point may precede the compression. In case of floating point data the mantissa and exponent may be compressed by two different compressors using different algorithms or settings. Alternatively the compression is only applied to mantissa or exponent depending on compression efficiency. Furthermore different compression algorithms may be used for offset, full-scale and imaging (modulated) data sets.

Control data, which may be transmitted separated from image data may be left uncompressed. Control data is data for controlling the hardware like the X-ray tube, processor hardware or the software like the compressor.

The compressor comprises a Predictor 940 which receives the data to be compressed 941 in the format of pixels as well as synchronization information regarding the location of such pixels within a possible image frame of given dimensions and form. The main goal of the Predictor is to predict the data to be compressed based on an internal model typically based on the history of incoming data. The output of the predictor is the difference between the incoming data and the predicted model which is sent to the Entropy Encoder 942 for encoding. The Entropy Encoder 942 encodes the difference data coming from the Predictor 940 into a compressed form resulting in compressed data. This data is then sent to an Error Protector 943 which annotates the incoming data with selective error protection code in order to protect the compressed data from a variety of errors. Finally the Error Protector 943 delivers the compressed and optionally error protected data 944 as output of the compressor.

Figure 7:
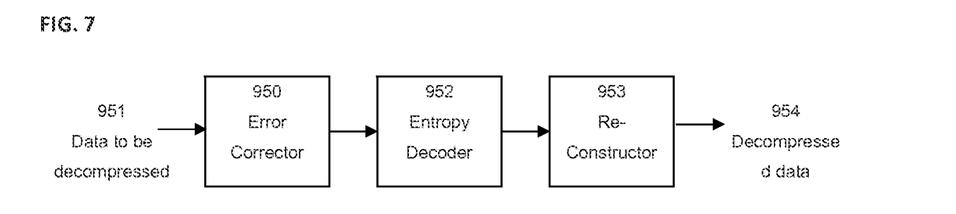
FIG. 7 shows a lossless decompressor.

FIG. 7 shows an exemplary embodiment of a lossless decompressor. Such a decompressor may be employed for image decompression as well as other types of data which previously have been compressed. The decompressor comprises an Error Corrector 950 that receives the data 951 to be decompressed in the format of encoded differences or pixels together with encoding and error protected parameters as well as synchronization information regarding the beginning and end of the data received and the anticipated dimensions and form of frames to be received. The Error Corrector may be responsible for identifying and correcting any errors within the incoming data based on the Error Correction and Detection Codes used and stripping the ECC and EDC information from the data before passing it on to an Entropy Decoder 952. The Entropy Decoder may receive the encoded differences or original pixels together with the encoding parameters. It may be responsible for decoding the information into plain signed differences to be added or subtracted from reference data by a Re-constructor 953. If original pixel data is received by the Entropy Encoder (in the case that no compression has been applied to the pixels) it may forward such pixels as they are to the Re-constructor. The Re-constructor may reconstruct the original pixel data by adding or subtracting the differences from the appropriate reference data it may have stored in its memory. Then, it may store the reconstructed data for future reference in its memory and then forward it in the form of pixels as the output 954 of the decompressor.

It will be appreciated to those skilled in the art having the benefit of this disclosure that this invention is believed to provide a data compressor and a method of data compression. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention Changes may be made in the elements described herein without departing from the spirit and scope of the invention as described in the following claims.

The invention claimed is:

1. A method for compressing raw computed tomography (CT) data from a CT scanner, comprising the steps of:
   a) receiving data from the CT scanner;
   b) selecting a model for predicting the data based on a history;
   c) calculating differences, D, between the received data and the model;
   d) comparing an actual compression ratio with a target compression ratio;
   e) performing, when the actual compression ratio is less than the target compression ratio, a lossy compression comprising:
      e.a) calculating lossy differences, D';
      e.b) calculating reconstructed approximation values, S", from the lossy differences, D';
      e.c) storing the approximation values, S", in the history;
   f) producing compressed data by encoding the lossy differences, D', calculated in step e.c) when the actual compression ratio is less than the target compression ratio and by encoding the differences, D, calculated in step c) when the actual compression ratio is at least one of greater than and equal to the target compression ratio; and
   g) outputting the compressed data produced in step f).

2. The method of claim 1, wherein step d) comprises the steps of:
   d.a) calculating an encoding;
   d.b) calculating a moving average of an encoding size; and
   d.c) calculating a required number of bits to reduce.

3. The method of claim 2, wherein in step d.c) the required number of bits to reduce is calculated by comparing the moving average of the encoding size with a target encoding size.

4. The method of claim 2, wherein in step d.c) the required number of bits to reduce is predefined for a predetermined number of samples.

5. The method of claim 1, wherein step e.a) includes calculating the lossy differences, D', by removing a number, R, of bits from the differences, D, calculated in step c), and step e.b) comprises the steps of:
   e.b.a) filling up of the lossy differences, D', with the number, R, of predetermined least significant bits;
   e.b.b) calculating first approximation values, S', by adding the lossy differences, D', to reference values, H, that are based on the history; and
   e.b.c) calculating the reconstructed approximation values, S", by overflow handling of the first approximation values S'.

6. The method of claim 5, wherein in step e.b.c) the overflow handled value, S", is calculated as:
   a value calculated by removing the most-significant bit (MSB) from S' when the MSB of S' is zero;
   a predetermined maximum sample value when the MSB of S' is nonzero and D' is nonnegative; and
   zero when the MSB of S' is nonzero and D' is negative.

7. A computer-implemented method for decompressing raw computed tomography (CT) data from a CT scanner, comprising the steps of:
   a) receiving a difference value in a computer system;
   b) determining with the computer system whether the received difference value is a lossy compressed value, D';
   c) performing with the computer system, when the difference value is a lossy compressed value, D', the steps comprising:
      c.a) filling up of D' with a predetermined number, R, of least significant bits;
      c.b) calculating a first approximation value, S', by adding D' to a reference value, H, based on a history;
      c.c) calculating an approximation value, S", from S' by overflow handling of S'; and
   d) outputting the decompressed value of S" and storing it in said history.

8. The method of claim 7, wherein in step c.c) the approximation value, S", is calculated as:
   a value calculated by removing the most-significant bit (MSB) from S' when the MSB of S' is zero;
   a predetermined maximum sample value when the MSB of S' is nonzero and when D' is nonnegative; and
   zero when the MSB of S' is nonzero and D' is negative.

9. A data compressor for compressing raw computed tomography (CT) data from a CT scanner, comprising:
   a computer system configured to perform the steps comprising:
   a) receiving data from the CT scanner;
   b) selecting a model for predicting the data based on a history;
   c) calculating differences, D, between the received data and the model;
   d) comparing an actual compression ratio with a target compression ratio;
   e) performing, when the actual compression ratio is less than the target compression ratio, a lossy compression comprising:
      e.a) calculating lossy differences, D';
      e.b) calculating reconstructed approximation values, S", from the lossy differences, D';
      e.c) storing the approximation values, S", in the history;
      e.d) producing compressed data by encoding the lossy differences, D'; and
   f) producing compressed data by encoding the lossy differences, D', calculated in step e.c) when the actual compression ratio is less than the target compression ratio and by encoding the differences, D, calculated in step c) when the actual compression ratio is at least one of greater than and equal to the target compression ratio; and
   g) outputting the compressed data produced in step f).

10. The data compressor of claim 9, wherein step d) comprises the steps of:

d.a) calculating an encoding size;
d.b) calculating a moving average of the encoding size; and
d.c) calculating a required number of bits to reduce.

11. The data compressor of claim 10, wherein in step d.c) the required number of bits to reduce is calculated by comparing of the moving average of the encoding size with a target encoding size.

12. The data compressor of claim 10, wherein in step d.c) the required number of bits to reduce is predefined for a predetermined number of samples.

13. The data compressor of claim 9, wherein step e.a) includes calculating the lossy differences D' by removing of a number, R, of bits from the differences, D, calculated in step c), and step e.b) comprises the steps of:

e.b.a) filling up of the lossy differences, D', with the number, R, of predetermined least significant bits;
e.b.b) calculating first approximation values, S', by adding the lossy differences, D', to reference values, H, based on the history; and
e.b.c) calculating an overflow handled value, S", from the first approximation values, S'.

14. The data compressor of claim 13, wherein in step e.b.c) the overflow handled value, S", is calculated as:

a value calculated by removing the most-significant bit (MSB) from S' when the MSB of S' is zero;
a predetermined maximum sample value when the MSB of S' is nonzero and D' is nonnegative; and
zero when the MSB of S' is nonzero and D' is negative.

15. A data decompressor for decompressing raw computed tomography (CT) data from a CT scanner, comprising:

a computer system configured to perform the steps comprising:
a) receiving a difference value;
b) determining whether the received difference value is a lossy compressed value, D';
c) performing, when the difference value is a lossy compressed value D', the steps comprising:
c.a) filling up of D' with a predetermined number, R, of least significant bits;
c.b) calculating a first approximation value, S', by adding D' to a reference value, H, based on a history;
c.c) calculating an approximation value, S", from S' by overflow handling of S'; and
d) outputting the decompressed value of S" and storing it in said history.

16. The data decompressor of claim 15, wherein in step c.c) the approximation value, S", is calculated as:

a value calculated by removing the most-significant bit (MSB) from S' when the MSB of S' is zero;
a predetermined maximum sample value when the MSB of S' is nonzero and when D' is nonnegative; and
zero when the MSB of S' is nonzero and D' is negative.

* * * * *